Figure 1:
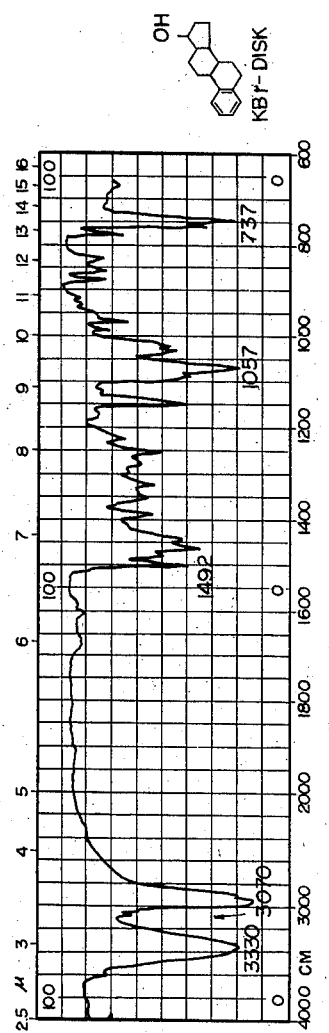

March 12, 1963  KYOICHI SAKAKIBARA ET AL  3,081,316
17-SUBSTITUTED 1,3,5(10)-ESTRATRIENES AND
COMPOSITIONS CONTAINING THE SAME
Filed Oct. 26, 1960  2 Sheets-Sheet 1

INVENTORS
KYOICHI SAKAKIBARA
MASANOBU SAWAI
BY ISSO CHUMAN

ATTORNEY

United States Patent Office 3,081,316
Patented Mar. 12, 1963

3,081,316
17-SUBSTITUTED 1,3,5(10)-ESTRATRIENES AND COMPOSITIONS CONTAINING THE SAME
Kyoichi Sakakibara, Tokyo, Masanobu Sawai, Yamato-shi, Kanagawa-ken, and Isso Chuman, Tokyo, Japan, assignors to Teikoku Zoki Seiyaku Kabushiki Kaisha, Tokyo, Japan, a corporation of Japan
Filed Oct. 26, 1960, Ser. No. 65,027
9 Claims. (Cl. 260—397.3)

This invention relates to novel and valuable steroidal compounds and the method of preparation thereof. More particularly the invention relates to 1,3,5(10)-estratrien-17β-ol, the fatty esters thereof and 1,3,5(10)-estratrien-17-one, and the method of preparing these compounds.

An object of this invention is to provide not only compounds effective against disorders such as arteriosclerosis, coronary sclerosis, hypercholesterolemia, climaterium disorder and dysmenorrhea but also the method not only of preparing these compounds as well as novel compositions containing these compuounds as an ingredient, which are useful for treatment of the aforesaid disorders.

Other objects and advantages of the invention will be apparent from a consideration of the following detailed description.

The 1,3,5(10)-estratrien-17β-ol of the present invention may also be referred to as 3-desoxyestradiol and is represented by the following Formula II:

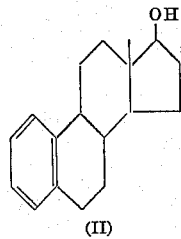

(II)

This 1,3,5(10)-estratrien-17β-ol reacts with an aliphatic acylating agent and readily forms the esters of fatty acids represented by Formula II′:

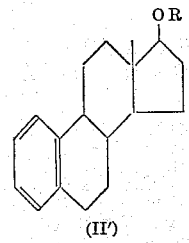

(II′)

wherein R represents the aliphatic acyl residue.

The 1,3,5(10)-estratrien-17-one may also be referred to as 3-desoxyestrone and is represented by the following Formula III:

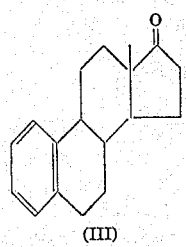

(III)

Therefore, in the present invention, for sake of convenience, 1,3,5(10)-estratrien-17β-ol having the above Formula II, its fatty acid esters having the Formula II′ and 1,3,5(10)-estratrien-17-one having the Formula III will be represented by the following general formula

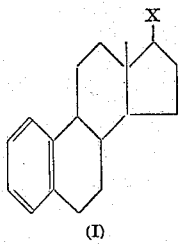

(I)

wherein X is the —OH, =O or —OR group (R is an aliphatic acyl residue).

In accordance with the present invention, 1,3,5(10)-estratrien-17β-ol having the aforementioned Formula II, that is, 3-desoxyestradiol, can be prepared by either of the following methods A or B, while 1,3,5(10)-estratrien-17-one, that is, 3-desoxyestrone having the aforementioned Formula III can be prepared by either method C or D.

Preparation of 3-Desoxyestradiol (A)

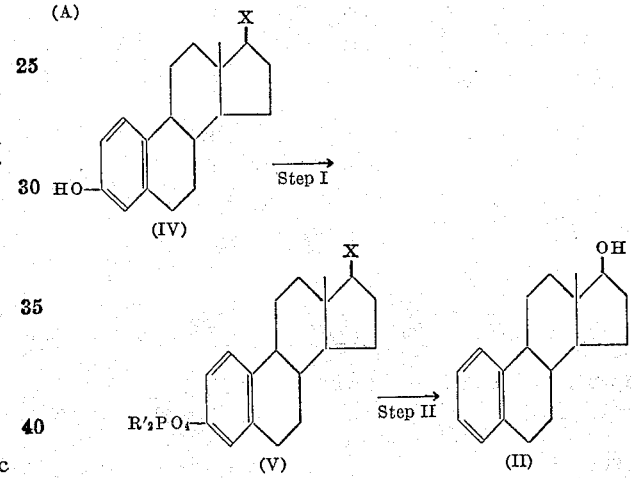

where X is a —OH, =O, or —OR group (R is an aliphatic acyl residue); and R′ is an alkyl radical.

In accordance with the aforementioned reaction Formula A, as Step I the estradiol having the Formula IV or its fatty acid esters at C(17), or estrone are first dissolved in a perhalogenated aliphatic hydrocarbon. A dialkyl phosphite such as, for example, diethyl hydrogen phosphite and a tertiary base such as, for example, triethylamine or pyridine are caused to act on this solution to form dialkyl phosphate at C(3) (Formula V). Next, as Step II by reduction of the dialkylphosphate of Formula V, which was obtained in Step I, the intended 3-desoxyestradiol, that is, 1,3,5(10)-estratrien-17β-ol is obtained.

As the aforesaid perhalogenated aliphatic hydrocarbons, any of those other than the perfluorinated aliphatic hydrocarbons, namely, perchlorinated aliphatic hydrocarbons, perbrominated aliphatic hydrocarbons, and periodinated aliphatic hydrocarbons are suitable. Among these, for example, the perchlorinated aliphatic hydrocarbons such as carbon tetrachloride and hexachloroethane, are particularly most suited from an economical as well as operational standpoint.

Moreover, in this instance, in order to enhance the solubility, it is desirable to use, for example, a suitable inert solvent that does not participate in the reaction such as tetrahydrofuran and ether. While it is convenient to use as the dialkyl phosphite a dialkyl phosphite containing a lower alkyl radical having 1 to 5 atoms, it is not to be construed as being restricted to the same. Also, the esterification of Step I should be carried out at preferably below room temperature.

While there are a wide variety of reduction methods that may be used in Step II, the method of reduction in which the dialkyl phosphate at C$_{(3)}$ of Formula V is reduced in liquid ammonia by using, for example, alkali metals such as lithium, sodium, etc. is most suitable. While this is most advantageously performed by a method in which the aforesaid ester of Formula V is dissolved in liquid ammonia followed by the addition of an alkali metal and finally adding an anhydrous lower alcohol such as absolute ethanol. This alcohol however need not necessarily be added.

By doing thus, 1,3,5(10)-estratrien-17β-ol can be prepared with very good yields using as the starting materials the following:

Estradiol

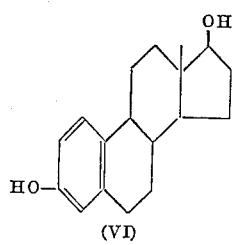

(VI)

The fatty acid esters at C$_{(17)}$ of estradiol

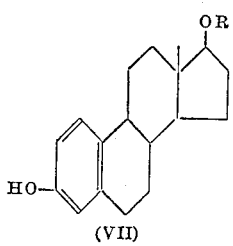

(VII)

wherein R is an aliphatic acyl radical, and

Estrone (B)

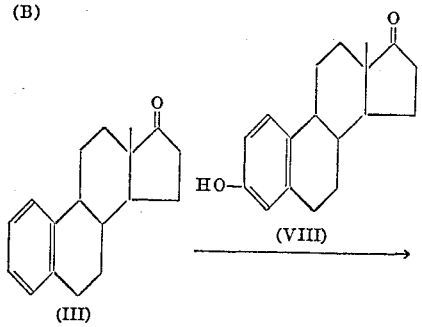

(III) (VIII)

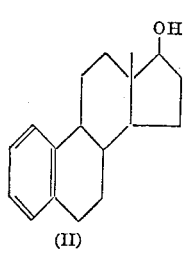

(II)

In accordance with the present invention, 1,3,5(10)-estratrien-17β-ol having the Formula II may also be prepared by reducing 1,3,5(10)-estratrien-17-one having the Formula III, a compound of the present invention, using a reducing agent which is capable of reducing only the ketone group at C$_{(17)}$ without reducing the benzene nucleus therein.

While as the reduction method it is possible to use methods such as catalytic reduction, the reduction in the presence of an alkali metal and an alcohol etc., it is most advantageous that the reduction be performed by using, for example, complex metal hydrides such as sodium borohydride. In this case, the 1,3,5(10)-estratrien-17-one of Formula III is dissolved in a solvent that does not participate in the reaction such as, for example, tetrahydrofuran and ether or alcohols, and by adding in excess the complex metal hydrides in their solid states, the reduction can be performed. Moreover, the aforesaid reducing reaction may be performed at any temperature below the boiling point of the solvent.

*Preparation of 3-Desoxyestrone*

(C)

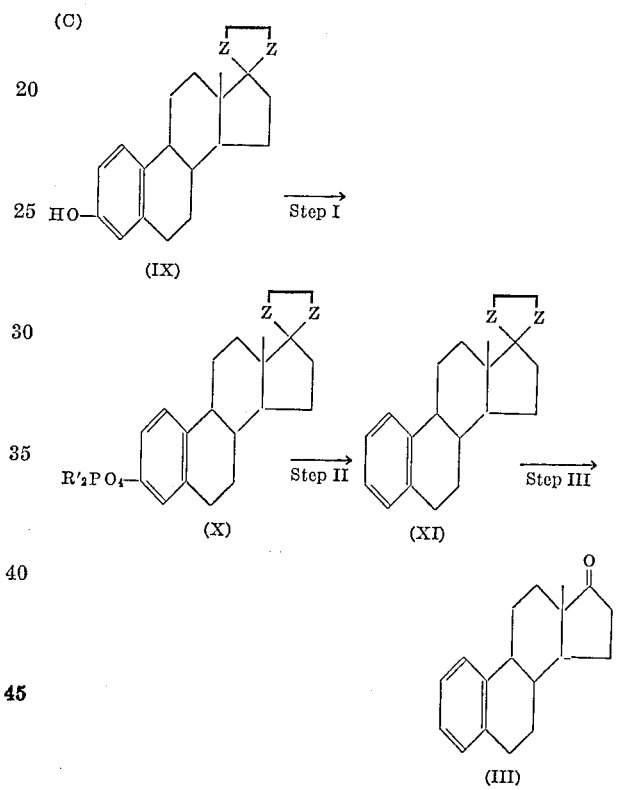

wherein the above reaction formula, R' is an alkyl group, and Z is an oxygen atom or sulfur atom.

In accordance with the above reaction Formula C, in Step I estrone-17-ethyleneketal or estrone-17-ethylenethioketal is dissolved in a perhalogenated aliphatic hydrocarbon other than a perfluorinated aliphatic hydrocarbon, and by reacting therewith dialkyl phosphite and a tertiary base a dialkyl phosphate at C$_{(3)}$ of these estrone-17-ethyleneketal or estrone-17-ethylenethioketal is formed. Then by Step II this is reduced and either 3-desoxyestrone-17-ethyleneketal or 3-desoxyestrone-17-ethylenethioketal is obtained. The Step I and Step II in this case can be performed in a manner completely identical to that of A method of preparing the aforesaid 3-desoxyestradiol.

The thus obtained 3-desoxyestrone-17-ethyleneketal or 3-desoxyestrone-17-ethylenethioketal is deketalized in accordance with known methods as Step III. Deketalization may be effected by dissolving the aforesaid ethyleneketal (Formula XI, Z=O) or ethylenethioketal (Formula XI, Z=S) in a suitable organic solvent such as, for example, methanol, and heating after adding to the same an inorganic or organic acid such as hydrochloric acid or acetic acid. Furthermore, it is preferable to use mercuric chloride and cadmium carbonate in performing the deketalizing reaction of the aforesaid thioketal. These reactions can be performed in nearly quantitative yield in all cases.

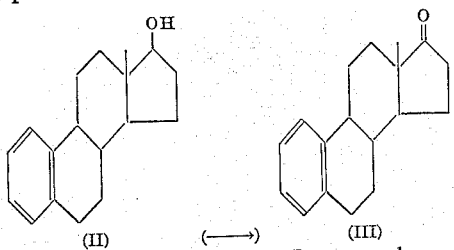

Moreover, 1,3,5(10)-estratrien-17-one can be prepared by oxidizing the 1,3,5(10)-estratrien-17β-ol of the present invention obtained in the aforesaid A and B methods.

As the oxidizing agent any that is capable of oxidizing only the hydroxyl group at C(17) while not oxidizing the benzene ring may be used. As the oxidation method, the Oppenauer method and the chromic acid oxidation method are particularly suitable. In case of the Oppenauer oxidation method, it can be performed by dissolving the aforesaid 1,3,5(10)-estratrien-17β-ol in a suitable inert solvent such as, for example, toluene, adding thereto cyclohexanone and aluminum alcoholate (that which has been newly prepared being particularly preferable) and then effecting the oxidation. On the other hand, in case of the chromic acid oxidation method, as an example, a method may be adopted wherein the 1,3,5(10)-estratrien-17-β-ol is dissolved in anhydrous acetone, to which a mixed aqueous solution of anhydrous chromic acid and sulfuric acid is added and then oxidation is effected. Needless to say, it is possible to adopt various other Oppenauer and chromic acid oxidation methods besides those illustrated above.

It is also possible to prepare the fatty acid esters of 1,3,5(10)-estratrien-17β-ol by acylating in accordance with accepted practices the 1,3,5(10)-estratrien-17-β-ol prepared in accordance with the present invention by the aforesaid A and B methods. Namely, by using such as, for example, acetic anhydride, propionic anhydride, enanthoyl chloride, etc., the respective esters, that is, acetate, propionate, enanthate, etc. are prepared. As the acylating agent that can be used, while the derivatives of fatty acids having 2–17 carbon atoms are preferred, it is not to be restricted to the same. Incidentally, if these fatty acid esters of 1,3,5(10)-estratrien-17β-ol are hydrolyzed, they will be converted to 1,3,5(10)-estratrien-17β-ol.

Both the thus obtained 1,3,5(10)-estratrien-17β-ol and 1,3,5(10)-estratrien-17-one having respectively the aforesaid Formulae II and III of the present invention can be recrystallized using a suitable solvent such as acetone-hexane or acetone-methanol, etc., the crystals in both cases exhibiting a slender prismatic appearance. By using these prismatic crystals and, as hereinafter described, as a result of having performed melting point determinations and elementary analyses as well as measurements of the ultraviolet and infrared absorption spectra, we confirmed that the compounds of the present invention were novel compounds having the aforesaid Formulae II and III.

In order to more clearly understand the present invention, the following specific examples for preparation of the compounds of the present invention are given, it being understood that the same are merely intended in an illustrative sense, and the invention should not be limited thereby, but only insofar as the same may be limited by the appended claims.

EXAMPLE 1

In 30 ml. of tetrahydrofuran and 50 ml. of carbon tetrachloride, 3 g. of estradiol were dissolved, and after adding 6.1 g. of diethyl hydrogen phosphite, the mixture was cooled in an ice-bath followed by dropwise addition of 4.9 g. of triethylamine with stirring, which was further continued for 4 hours at 0° C. and then the mixture was allowed to stand at room temperature overnight. The reaction mixture was washed successively with 100 ml. of 3 N hydrochloric acid, two 100 ml. portions of 5% aqueous sodium hydroxide and water, dried and evaporated to give 4 g. of crude estradiol-3-diethylphosphate (V). When recrystallized from hexane it forms colorless plates, M.P. 101–103° C.

The above crude diethylphosphate (V) was dissolved in 100 ml. of ether and mixed with 250 ml. of liquid ammonia. 450 mg. of metallic lithium was added rapidly in small pieces with stirring, which was further continued for 15 min., then 5 ml. of absolute ethanol were added to destroy the blue color. Ammonia was evaporated, water was added cautiously and the layers were separated. The aqueous layer was extracted with ether, the ether solutions were combined and washed with 100 ml. of 5% aqueous sodium hydroxide and water. The dried solution was evaporated and the oily product was triturated with hexane to induce easy crystallization. When recrystallized from acetone-hexane, 2 g. of prismatic crystals of 3-desoxyestradiol having the M.P. of 111–112° C. were obtained. The yield from estradiol was 65%.

EXAMPLE 2

5.0 g. of estradiol-17-monoacetate (VII) were dissolved in a mixture of 40 ml. of tetrahydrofuran, 60 ml. of carbon tetrachloride and 8.8 g. of diethyl hydrogen phosphite. The solution was cooled in an ice-bath and 6.5 g. of triethylamine were added dropwise with stirring. After stirring for 4 hours at 0° C. the mixture was allowed to stand overnight at room temperature. The reaction mixture was washed successively with 100 ml. of 3 N hydrochloric acid, 3 100 ml. portions of 5% aqueous sodium hydroxide solution and water, dried, and evaporated in vacuo to leave 8.3 g. of syrupy dialkyl phosphate (V). When recrystallized from acetone-hexane, prismatic crystals having the M.P. 84–86° C. were obtained.

$\lambda_{max}$ 270 m$\mu$, 277 m$\mu$, log $\epsilon$=2.93, 291

The above crude syrupy phosphate in 120 ml. of anhydrous ether was mixed with 350 ml. of liquid ammonia, and small pieces of 700 mg. of lithium metal were added rapidly with stirring. The resulting blue solution was stirred for 15 min. followed by dropwise addition of 10 ml. of anhydrous ethanol to effect decolorization. Then ammonia was evaporated, water added cautiously, and extracted with ether, the ether layer was washed with 100 ml. of 5% aqueous sodium hydroxide solution and water, dried over anhydrous magnesium sulfate. Evaporation of ether gave an oily product which crystallized rapidly upon trituration with hexane. 3-desoxyestradiol was recrystallized from acetone-hexane to give 3.3 g. (81%) of colorless prisms, M.P. 112° C.

$\lambda_{max}$ 266 m$\mu$, 274 m$\mu$, log $\epsilon$=2.67, 268

EXAMPLE 3

To 5 g. of estradiol-17-monopropionate (VII) in 60 ml. of carbon tetrachloride and 20 ml. of tetrahydrofuran were added 8.4 g. of diethyl hydrogen phosphite and treated with 6.2 g. of triethylamine in exactly the same manner as in Example 2 whereby was obtained 6.5 g. of oily diethyl phosphate (V).

When this ester was reduced using 600 mg. of metallic lithium in 70 ml. of ether and 300 ml. of liquid ammonia, 2.7 g. of the intended 3-desoxyestradiol were obtained. Its M.P. was 110–112° C., and the yield was 70% from VII.

EXAMPLE 4

2 g. of estradiol-17-monocaproate (VII) in 30 ml. of carbon tetrachloride, 8 ml. of tetrahydrofuran, 3.0 g. of diethyl hydrogen phosphite were treated with 2.2 g. of triethylamine in exactly the same manner as in Example 2 whereby was obtained 3.4 g. of oily diethyl phosphate.

This was reduced using 50 ml. of ether, 100 ml. of liquid ammonia, and 280 mg. of metallic lithium; and 0.9 g. of 3-desoxyestradiol was obtained. The yield was 65% from (VII), and the M.P. was 110–111° C.

EXAMPLE 5

5 g. of estrone were dissolved in a mixture of 50 ml. of tetrahydrofuran and 50 ml. of carbon tetrachloride, and cooled in an ice-bath. After adding 8.0 g. of diethyl hydrogen phosphite, 7.0 g. of triethylamine were added dropwise with stirring. 2 hours later after returning the stirring mixture to room temperature, it was allowed to stand overnight. The reaction mixture was washed successively with 100 ml. of 3 N hydrochloric acid, 3 100 ml. portions of 5% aqueous sodium hydroxide, and water. When the solvent was removed after drying, 8 g. of estrone-3-diethyl phosphate were obtained as a light yellow syrup.

The aforesaid crude diethyl phosphate was dissolved in 150 ml. of ether, mixed with 300 ml. of liquid ammonia and while stirring 700 mg. of metallic lithium were added rapidly in small pieces. 15 min. later, 5 ml. of absolute ethanol were added and decolorization was effected. Then ammonia was evaporated, water was added carefully and extracted with ether. The ether solution was washed with 100 ml. of 5% aqueous sodium hydroxide and water, dried, and evaporated. The remaining colorless oil was easily crystallized when triturated with hexane, then recrystallized from acetone-hexane to give 3.5 g. of 3-desoxyestradiol as prisms with M.P. 110–112° C.; the yield being 70% from estrone.

EXAMPLE 6

1 g. of estrone-17-ethyleneketal (IX, Z=O) was dissolved in 10 ml. of tetrahydrofuran and 20 ml. of carbon tetrachloride and after adding 1.8 g. of diethyl hydrogen phosphite, the solution was cooled in an ice-bath. To this solution were added dropwise 1.3 g. of triethylamine with stirring which was further continued for 4 hours, then the solution was allowed to stand at room temperature overnight. It was then washed successively with 100 ml. of 1 N hydrochloric acid, 4 100 ml. portions of 5% aqueous sodium hydroxide and water. When the solvent was removed after drying, 1.4 g. of diethyl phosphate (X) was obtained as a colorless oil, which was difficult to crystallize.

The above crude diethyl phosphate was dissolved in 50 ml. of ether, and this solution was added to 80 ml. of liquid ammonia. While stirring, 150 mg. of metallic lithium were added rapidly in small pieces, and the resultant blue solution was stirred for 15 min. followed by decolorization with dropwise addition of 2 ml. of absolute ethanol. After the ammonia was evaporated, water was added cautiously and the layer separated. The aqueous layer was extracted with ether, the combined ether layers were washed with 100 ml. of a 5% aqueous sodium hydroxide solution. After drying and distilling off ether, the resultant colorless oil was treated to induce crystallization. 3-desoxyesterone-17-ethyleneketal, M.P. 76° C., was obtained as long plates from methanol. The yield was 0.71 g. or 75% from IX.

EXAMPLE 7

800 mg. of 3-desoxyestrone-17-ethyleneketal was dissolved in a mixture of 40 ml. of acetic acid and 10 ml. of water, and the solution was refluxed for 30 min. After cooling, the mixture was poured into water. The crystals were filtered, thoroughly washed with water to give 650 mg. of crude 3-desoxyestrone. When recrystallized from methanol, it melted at 132–135° C. without or with authentic sample.

EXAMPLE 8

By doing exactly the same as in Example 6, 2.9 g. of oily diethyl phosphate were obtained from 2.0 g. of estrone-17-ethylenethioketal, 3.2 g. of diethyl hydrogen phosphite, 30 ml. of tetrahydrofuran, 50 ml. of carbon tetrachloride and 2.4 g. of triethylamine.

This was reduced in 150 ml. of liquid ammonia with 320 mg. of metallic lithium, and 1.3 g. of 3-desoxyestrone-17-ethylenethioketal (XI, Z=S) was obtained as fine needles from acetone, M.P. 130° C.; the yield being 70% from IX.

EXAMPLE 9

A mixture consisting of 200 mg. of 3-desoxyestrone-17-ethylenethioketal, 300 mg. of mercuric chloride, 400 mg. of cadmium carbonate, 1 ml. of water, and 15 ml. of acetone was refluxed for 6 hours. After cooling, the inorganic salts were filtered off and washed with acetone, the acetone solution was concentrated to leave 110 mg. of crude 3-desoxyestrone. This was recrystallized first from acetone then from methanol, and then showed M.P. of 133–134° C. and not depressed upon mixing with the authentic sample.

Completely identical results are also obtainable by using glacial acetic acid instead of the aforesaid acetone.

EXAMPLE 10

3 g. of 3-desoxyestrone were dissolved in 150 ml. of methanol, and then after adding 1.0 g. of sodium borohydride, the solution was stirred for 2 hours at room temperature, and allowed to stand overnight. A small amount of acetic acid was added to decompose the excess reducing agent, methanol was removed under reduced pressure, water was added, and crystals were filtered off and washed with water to give 2.9 g. of crude 3-desoxyestradiol; prisms from acetone-hexane, M.P. 111–113° C., not depressed with the authentic sample.

EXAMPLE 11

5 g. of 3-desoxyestradiol was dissolved in 400 ml. of acetone distilled over chromic acid, and while stirring vigorously at room temperature 7 ml. of an oxidizing reagent, which was prepared by dissolving 3.3 g. of chromic anhydride and 2.7 ml. of concentrated sulfuric acid in water as to amount to 12.5 ml., was added dropwise during 2 min. After stirring further for 1 min. solid sodium bisulfite was added to destroy the excess oxidizing agent. This was followed by the addition of a saturated solution of sodium carbonate whereby the acetone layer was separated and dried. When acetone was removed, 5 g. of crude 3-desoxyestrone crystallized. This was recrystallized from acetone and from methanol, and 4 g. of pure product having M.P. 137° C., was obtained; the yield being 80%.

EXAMPLE 12

A mixture of 2 g. of 3-desoxyestradiol, 20 ml. of acetic anhydride and 10 ml. of pyridine was allowed to stand overnight at room temperature, which was then poured into water. The crystals formed were filtered out and washed with water. Upon recrystallization from methanol, 3-desoxyestradiol-17-acetate was obtained as colorless plates, M.P. 114–115° C. The yield was quantitative.

EXAMPLE 13

3-desoxyestradiol-17-propionate was obtained in quantitative yield from 0.5 g. of 3-desoxyestradiol, 5 ml. of pyridine and 3 ml. of propionic anhydride by performing as in Example 12. Colorless needles, M.P. 99–100° C.

EXAMPLE 14

A mixture of 500 mg. of 3-desoxyestradiol, 5 ml. of pyridine and 1 ml. of enanthoyl chloride after allowed to stand overnight at room temperature was poured into water and was extracted with ether. The ether solution was washed successively with dilute hydrochloric acid, saturated sodium bicarbonate solution and water, dried, and evaporated to give a light brown oil, which was chromatographed over 30 g. alumina. Benzene eluated a colorless oil which crystallized spontaneously, and the product was recrystallized from methanol to give the desired 3-desoxyestradiol-17-enanthate as long plates, M.P. 50–51° C.; the yield being quantitative.

We confirmed that the products obtained in the aforesaid Examples 1 and 7 were respectively 1,3,5(10)-estratrien-17β-ol and 1,3,5(10)-estratrien-17-one from the results of elementary analysis and ultraviolet and infrared ray absorption spectra, as described below:

(1) ELEMENTARY ANALYSIS

Product of Example 1:
  Calculated for $C_{18}H_{24}O$: C 84.38%, H 9.38%
  Found: C 84.31%, H 9.44%

Product of Example 5:
  Calculated for $C_{18}H_{24}O$: C 85.04%, H 8.66%
  Found: C 85.00%, H 8.70%

(2) ULTRAVIOLET ABSORPTION SPECTRUM

The following results were obtained when the wave length of absorption maximum and log ε were measured in a 95% ethanol: ε represents the extinction coefficient, and log ε was shown within parenthesis.

Product of Example 1: 266 mµ (2.67), 274 mµ (2.68)
Product of Example 7: 266 mµ (2.69), 274 mµ (2.71), 286 mµ (1.95)

The above absorption maximum and log ε in all cases were in agreement with that of the chromophore of the tetralin type. [Note: Refer to C. S. Marvel, R. Mozingo, E. C. Kirkpatrick; J. Am. Chem. Soc., 61, 2006 (1939) and J. Weinstock, V. Boekelheide; ibid., 75, 2547 (1953).] Moreover, since these do not coincide with the absorption maximum and log ε of 3-hydroxy-1,3,5(10)-estratrien-17β-ol

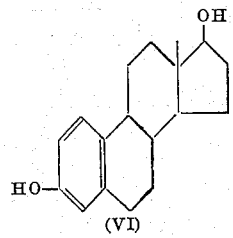

(VI)

which has an absorption maximum 280 mµ (log ε=3.30), it was confirmed that the aforesaid products of Examples 1 and 7 do not possess the hydroxyl group of the A ring.

(3) INFRARED ABSORPTION SPECTRUM

Figure 2:
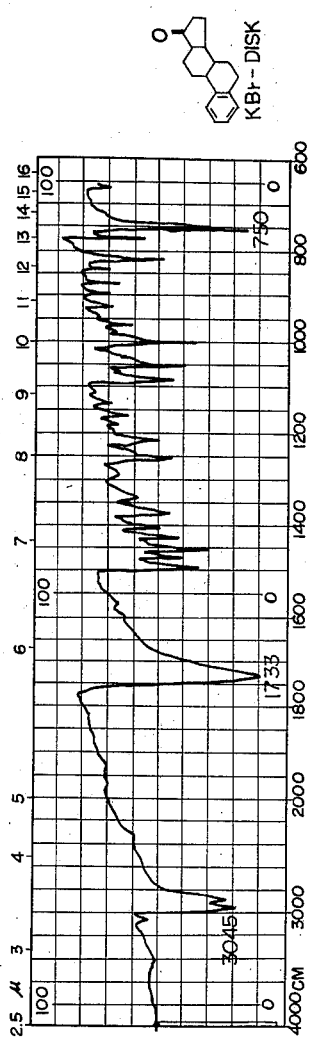

The charts of the infrared absorption spectra of the products of Examples 1 and 7 are shown in FIGS. 1 and 2 respectively.

The presence of the aromatic ring[1] and the hydroxyl group[2] in the product of Example 1 are indicated respectively by the presence of the absorption 3070 cm.$^{-1}$, 1492 cm.$^{-1}$, and 3330 cm.$^{-1}$, 1057 cm.$^{-1}$ in FIG. 1. Therefore, it is clear that the single oxygen atom represented by its molecular formula is that of a hydroxyl group. And furthermore, that this hydroxyl group present at position 17 and not at position 3 is proven not only from the fact that it has not phenolic character but also from the infrared spectra of its derivatives. Precisely, if the product of Example 1 (that whose infrared absorption spectrum is shown in FIG. 1) is oxidized, a ketone having an infrared absorption spectra as shown in FIG. 2 is obtained. The absorption of the carbonyl group being 1733 cm.$^{-1}$ shows that it is a five-membered ketone,[3] that is, 17-ketone in this case. Hence the starting material is 17-ol. Furthermore, the absorption of 737 cm.$^{-1}$ in FIG. 1 and 750 cm.$^{-1}$ in FIG. 2 are in both cases the characteristic absorptions of ortho-disubstituted benzene.[4] From this also, the positions of substitution with respect to the A ring cannot be other than positions 5 and 10. (In view of the type of reaction, it is not thinkable that various rearrangement reactions other than the separation reaction of the hydroxyl group would occur.) Thus, it is proven that the hydroxyl group does not remain at position 3.

From the foregoing results, we confirmed that the products of Examples 1 and 7 were respectively 1,3,5(10)-estratrien-17β-ol and 1,3,5(10)-estratrien-17-one. From the results of similar analyses and mixed melting tests we confirmed that the products of Examples 2–5 and 10 were, as in Example 1, 1,3,5(10)-estratrien-17β-ol and that the products of Examples 7, 9 and 11 were each 1,3,5(10)-estratrien-17-one.

Figure 3:
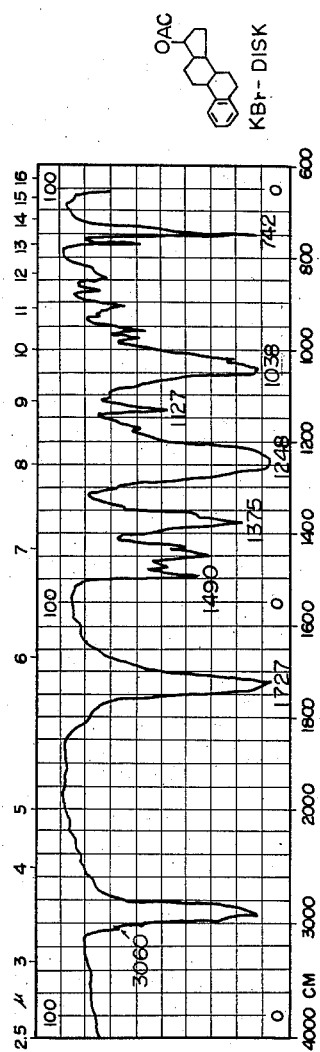
Figure 4:
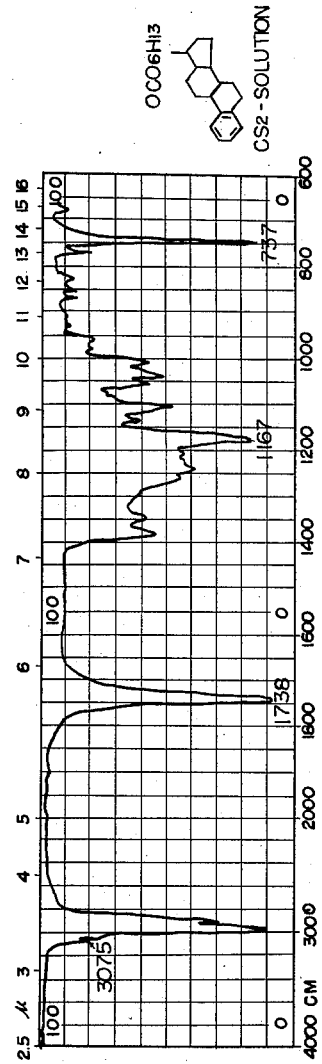

The charts of the infrared absorption spectrum of the products of Examples 12 and 14 are shown in FIGS. 3 and 4 respectively. The absorption of 1727 cm.$^{-1}$ or 1737 cm.$^{-1}$ is the absorption of an ester of an alcoholic hydroxyl group and not that of a phenolic hydroxyl group.[5]

We confirmed from the charts of FIGS. 3 and 4 and the aforementioned elementary analysis and ultraviolet absorption spectra, etc. that the products of Examples 12 and 14 had respectively the structural formulae represented as follows:

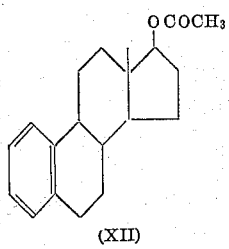

(XII)

and

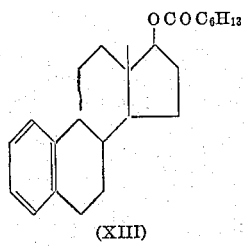

(XIII)

Also, in accordance with the same method it was confirmed that the product of Example 13 had the following formula:

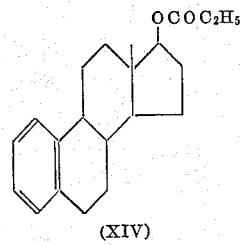

(XIV)

As a result of our further studies, we found that the 1,3,5(10)-estratrien-17β-ol (II) and its fatty acid esters (II') and 1,3,5(10)-estratrien-17-one (III), prepared as hereinabove described, in all cases had a very high lipid shifting activity (the details thereof will be explained hereinafter), higher than any of the heretofore-known steroidal lipid shifting agent. Furthermore, the heretofore-known steroidal lipid shifting agent possess estrogenic activity (the details thereof will be explained hereinafter). When these are used as lipid shifting preparations, there is manifested feminization and other harmful side effects. On the other hand, in these compounds of the present invention this side effect, that is, estrogenic activity (E) is exceeding low. Hence, the proportion of the lipid shifting activity (L) to estrogenic activity (E), that is, the therapeutic effect (L/E) is very large. Thus, we found that the compounds of the present invention, as described hereinabove, were very valuable as medicines for curing human diseases such as arteriosclerosis including cerebral arteriosclerosis and renal arteriosclerosis, coronary sclerosis including angina pectoris, myocardial infarction, etc.,

---

[1] L. J. Bellamy, The Infrared Spectra of Complex Molecules, 2nd ed., page 64, John Wiley & Sons, Inc., New York (1958).
[2] Ibid p. 96.
[3] Ibid., p. 132.
[4] L. J. Bellamy, The Infrared Spectra of Complex Molecules, 2nd ed., page 75, John Wiley & Sons, Inc., New York (1958).
[5] Ibid., p. 179.

hypercholesterolemia, climacterium disorders, dysmenorrhea, etc.

In general, these diseases have in common the point that at least one of their causes lies in the malfunction of the endocrine function, the cause being thought to be particularly due to deficiency of estrogenic hormones. For example, coronary thrombosis and myocardial infarction occur five to ten times more frequently in men than in women, and particularly under the age of 40 the predominance in males is 25:1 or even more. However with the climacteric in the female, that is, with the decline in the secretion of the estrogenic hormones as the dividing point the incidence of these diseases in the females gradually rises as to approach that of the males of the same age. Between the ages of fifty to sixty the incidence is the same or in some cases even higher in females. In these diseases there is in common an increase in cholesterol in the blood serum. Therefore, it is presumable from the foregoing fact that the estrogenic hormones are instrumental in preventing these diseases by restraining the accumulation of cholesterol in the blood serum.

Furthermore, when the correlation with respect to these diseases are actually investigated in detail, the correlation of the ratio of the serum cholesterol value (C) to the serum phospholipid value (P), that is, the C/P value is a better indication. Therefore, the effect of a drug is expressed by the ability to depress this C/P, and, this ability has been named the lipid shifting activity.[6]

The natural estrogenic hormones, as hereinabove described, generally have this lipid shifting activity. For example, Katz et al. (1953) found that feeding excess cholesterol to cockerels produced experimental arteriosclerosis and that cure may be had by injection of estrone or estradiol.[7] These natural estrogenic hormones have also been used clinically with some success for the cure of these diseases. However, with these natural estrogenic hormones on account of their estrogenic activity which is an intrinsic property, feminization and other harmful side effects occurred as to render their use impractical.

Therefore, needless to say, as a preparation for treating these diseases that in which the lipid shifting activity (L) is large while on the other hand the estrogenic activity (E) is small is desired, this being the aforementioned therapeutic effect (L/E). While to date, as those possessing large therapeutic effect there are known such as 16α-chloro-estrone methyl ether having the following Formula XV

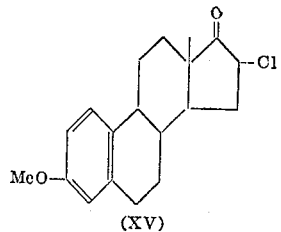

(XV)

and 16α-methyl-16-epi-estriol-3-methyl ether having the following Formula XVI:

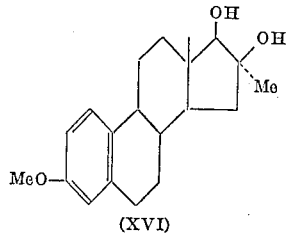

(XVI)

none are of practical use.[8][9]

[6] M. M. Gertner et al., Circulation, 2, 205 (1950).
[7] L. N. Katz, J. Stamler, Experimental Arteriosclerosis, p. 291, C. C. Thomas, Springfield, Illinois (1953).
[8] D. P. Barr, Circulation, 8, 641 (1953).
[9] M. F. Oliever, G. S. Boyd, Lancet, 2, 1273 (1956).

The results of measurements of the estrogenic activity (E) and lipid shifting activity (L) of the compounds of the present invention 3-desoxyestradiol (II) and 3-desoxyestrone (III) will be shown in Examples 15–19 as follows:

EXAMPLE 15

*Estrogenic Activity Test*

10 mg. each of 3-desoxyestrone and 3-desoxyestradiol were dissolved respectively in 1 ml. of sesame oil, and 0.4 ml. of each of these were further diluted successively to obtain solutions containing to each 0.1 ml. respectively steroids in the amounts of 1γ, 10γ, 100γ and 1000γ. 0.1 ml. of each of these were then injected subcutaneously in spayed female mouse (castrated at a weight of about 18 g., 4 weeks after castration), and examination was made in accordance with the Allen-Doisy method,[10] determinations being made of estrogenic activity by the ratio of animals exhibiting the fully estrous state. The results are shown in Table I, below.

TABLE I

| Compound | Dose (γ) | Number of animals | Number of animals exhibiting estrus | Positive rate (percent) |
| --- | --- | --- | --- | --- |
| 3-desoxyestrone | 1 | 5 | 0 | 0 |
|  | 10 | 5 | 2 | 40 |
|  | 100 | 5 | 5 | 100 |
|  | 1,000 | 5 | 5 | 100 |
| 3-desoxyestradiol | 1 | 5 | 2 | 40 |
|  | 10 | 5 | 5 | 100 |
|  | 100 | 5 | 5 | 100 |
|  | 1,000 | 5 | 5 | 100 |

From this, it is believed that in case of 3-desoxyestrone 1 unit is 10–20γ, and in case of 3-desoxyestradiol 1 unit is 1–2γ, and since 1 unit of esterone is 0.1γ, the estrogenic activity considering estrone as 100 would be respectively 0.5–1 and 5–10.

EXAMPLE 16

*Test of Lipid Shifting Activity When Injected*

40 mg. of 3-desoxyestrone, 50 mg. of 3-desoxyestradiol and 30 mg. of estrone were each separately dissolved in 15 ml. of rape oil and made respectively into a 0.27%, a 0.33% and a 0.20% solution. Using these solutions the lipid shifting activity was examined in accordance with the method of Cook et al.[11] Using white leghorn cocks (45-day old chicks) 0.5 ml. a day of the above steroidal solutions were injected intramuscularly for 6 days while providing a feed containing cholesterol (chick food to which 10% of rape oil and 2% of cholesterol were added) for the 6-day period from the beginning to end of the steroidal administration. On the 7th day blood was taken from the cervical region, and after separating the serum, 0.5 ml. of this serum was extracted with Bloor's reagent (3 parts of alcohol+1 part of ether). After filtration, a part of it was taken, and the cholesterol was determined by the method of Zak et al.,[12] while the phospholipid was determined by first decomposing with perchloric acid the residue resulting from evaporating the filtrate and then determined as an inorganic phos-

[10] Allen-Doisy Test: G. Pincus, K. V. Thimann, The Hormones, I. p. 341, Academic Press Inc., New York (1948).
[11] D. L. Cook et al., Endocrinology, 62, 798 (1958).
[12] B. Zak, R. C. Dickenman, Am. J. Clin. Pathol., 24, 1307 (1954).

phor with amino-naphthol-sulfonic acid and ammonium molybdate. This figure was multiplied by 25 to obtain the value of phospholipid, since the phosphor of lecithin is 4%.

The results of the test are shown in Table II, below.

Estrone is the known steroidal compound having the aforementioned Formula VIII.

EXAMPLE 17

*Test of Lipid Shifting Activity When Injected*

50 mg. of 3-desoxyestrone were dissolved in 25 ml. of

TABLE II

| Compound | Total administered dosage for 6 days (mg.) | Test No. | Body weight (g.) | Serum cholesterol (mg. percent) | Serum phospholipid in serum (mg. percent) | C/P | L.S. activity |
|---|---|---|---|---|---|---|---|
| 3-desoxyestrone | 8 | 1 | 244 | 453 | 709 | 0.64 | |
|  | 8 | 2 | 314 | 663 | 552 | 1.20 | |
|  | 8 | 3 | 274 | 1,018 | 2,082 | 0.49 | |
|  | 8 | 4 | 244 | 912 | 1,585 | 0.58 | |
|  | 8 | 5 | 257 | 909 | 1,615 | 0.56 | |
|  |  | Average | 267 | 791 | 1,309 | 0.69 | 375 |
| 3-desoxyestradiol | 10 | 1 | 260 | 785 | 1,282 | 0.61 | |
|  | 10 | 2 | 230 | 572 | 738 | 0.77 | |
|  | 10 | 3 | 230 | 775 | 1,673 | 0.46 | |
|  | 10 | 4 | 230 | 636 | 1,320 | 0.48 | |
|  |  | Average | 238 | 692 | 1,253 | 0.58 | 345 |
| Estrone (control agent) | 6 | 1 | 335 | 980 | 1,027 | 0.95 | |
|  | 6 | 2 | 325 | 643 | 452 | 1.43 | |
|  | 6 | 3 | 273 | 562 | 335 | 1.68 | |
|  | 6 | 4 | 250 | 366 | 332 | 1.10 | |
|  | 6 | 5 | 257 | 369 | 377 | 0.98 | |
|  | 6 | 6 | 190 | 346 | 260 | 1.33 | |
|  |  | Average | 271 | 544 | 464 | 1.25 | 100 |
| Control | 0 | 1 | 260 | 508 | 333 | 1.53 | |
|  | 0 | 2 | 222 | 419 | 268 | 1.56 | |
|  | 0 | 3 | 242 | 798 | 454 | 1.76 | |
|  | 0 | 4 | 223 | 414 | 420 | 0.99 | |
|  | 0 | 5 | 226 | 378 | 340 | 1.11 | |
|  |  | Average | 234 | 503 | 363 | 1.39 | |

With respect to the lipid shifting activity (L.S. activity), it was calculated with the following equation considering the value of estrone as being 100.

$$\text{L.S. activity} = \frac{C/P \text{ (control)} - C/P \text{ (sample)}}{\text{dose (sample)}} \times \frac{\text{dose (estrone)}}{C/P \text{ (control)} - C/P \text{ (estrone)}} \times 100$$

rape oil and a 0.20% solution was obtained. 0.5 ml. (1 mg.) of this and 0.5 ml. of a 0.20% solution of estrone prepared in a similar manner were injected continuously for 6 days, and measurements of C/P were made as in Example 16. These results are shown in Table III, below:

TABLE III

| Compound | Animal No. | Total dosage (mg.) | Serum cholesterol (mg. percent) | Serum phospholipid (mg. percent) | C/P | Lipid shifting activity (estrone =100) |
|---|---|---|---|---|---|---|
| 3-desoxyestrone | 1 | 6 | 507 | 2,235 | 0.23 | |
|  | 2 | 6 | 629 | 1,143 | 0.55 | |
|  | 3 | 6 | 521 | 1,923 | 0.27 | |
|  | 4 | 6 | 680 | 1,965 | 0.35 | |
|  | 5 | 6 | 489 | 729 | 0.67 | |
|  | 6 | 6 | 675 | 1,498 | 0.45 | |
|  | 7 | 6 | 661 | 2,330 | 0.26 | |
|  | Average |  | 594 | 1,689 | 0.397±0.15 | 218 |
| Estrone | 1 | 6 | 684 | 1,308 | 0.52 | |
|  | 2 | 6 | 459 | 404 | 1.14 | |
|  | 3 | 6 | 706 | 784 | 0.90 | |
|  | 4 | 6 | 593 | 423 | 1.40 | |
|  | Average |  | 611 | 730 | 0.99±0.32 | 100 |
| Control | 1 | 0 | 478 | 262 | 1.82 | |
|  | 2 | 0 | 586 | 274 | 2.14 | |
|  | 3 | 0 | 488 | 308 | 1.58 | |
|  | 4 | 0 | 429 | 292 | 1.47 | |
|  | 5 | 0 | 382 | 439 | 0.87 | |
|  | 6 | 0 | 579 | 533 | 1.09 | |
|  | Average |  | 490 | 351 | 1.49±0.40 | |

EXAMPLE 18

*Test of Lipid Shifting Activity When Injected*

20 mg. each of 3-desoxyestrone and 3-desoxyestradiol were dissolved respectively in 20 ml. of rape oil and made into 0.10% solutions. 0.5 ml. (0.5 mg.) of these was injected continuously for 6 days, and measurements were made as in Example 16. The results are shown in Table IV, below:

TABLE IV

| Compound | Animal No. | Total dosage (mg.) | Body weight (g.) | Serum cholesterol (mg. percent) | Serum phospholipid (mg. percent) | C/P | Lipid shifting activity (estrone =100) |
|---|---|---|---|---|---|---|---|
| 3-desoxyestrone | 1 | 3 | 455 | 628 | 856 | 0.734 | |
| | 2 | 3 | 394 | 671 | 1,514 | 0.442 | |
| | 3 | 3 | 292 | 523 | 1,173 | 0.446 | |
| | 4 | 3 | 220 | 422 | 287 | 1.47 | |
| | 5 | 3 | 265 | 643 | 834 | 0.77 | |
| | 6 | 3 | 220 | 645 | 539 | 1.20 | |
| | Average | | 325 | 589 | 867 | 0.844 | 251 |
| 3-desoxyestradiol | 1 | 3 | 322 | 615 | 1,234 | 0.498 | |
| | 2 | 3 | 270 | 633 | 1,513 | 0.418 | |
| | 3 | 3 | 292 | 581 | 697 | 0.834 | |
| | 4 | 3 | 440 | 594 | 715 | 0.831 | |
| | 5 | 3 | 310 | 766 | 1,090 | 0.702 | |
| | 6 | 3 | 235 | 636 | 1,184 | 0.536 | |
| | Average | | 312 | 638 | 1,072 | 0.636 | 288 |
| Estrone | 1 | 6 | 469 | 660 | 581 | 1.14 | |
| | 2 | 6 | 288 | 765 | 547 | 1.40 | |
| | 3 | 6 | 231 | 633 | 490 | 1.29 | |
| | 4 | 6 | 385 | 714 | 1,302 | 0.55 | |
| | 5 | 6 | 300 | 724 | 560 | 1.29 | |
| | Average | | 335 | 699 | 964 | 1.133 | 100 |
| Control | 1 | 0 | 247 | 506 | 198 | 2.56 | |
| | 2 | 0 | 250 | 288 | 170 | 1.69 | |
| | 3 | 0 | 160 | 374 | 223 | 1.68 | |
| | 4 | 0 | 170 | 620 | 228 | 2.72 | |
| | 5 | 0 | 164 | 453 | 169 | 2.68 | |
| | Average | | 198 | 448 | 198 | 2.27 | |

EXAMPLE 19

*Test of Lipid Shifting Activity When Orally Administered*

3-desoxyestrone and 3-desoxyestradiol were each made into 0.20% solutions in a manner similar to Example 17. 0.5 ml. (1 mg.) of these were administered orally once daily by opening the mouth of chickens and using a stomach tube. Otherwise the same procedures as in Example 16 were used, and measurements of the C/P were made. The results are shown in Table V, below. For purpose of comparison, estrone was however administered by injection.

TABLE V

| Compound | Animal No. | Total dosage (mg.) | Body weight (g.) | Serum cholesterol (mg. percent) | Serum phospholipid (mg. percent) | C/P | L.S. activity [estrone=100 (injection)] |
|---|---|---|---|---|---|---|---|
| 3-desoxyestrone | 1 | [1] 6 | 325 | 401 | 329 | 1.22 | |
| | 2 | [1] 6 | 320 | 378 | 460 | 0.82 | |
| | 3 | [1] 6 | 385 | 358 | 323 | 1.11 | |
| | 4 | [1] 6 | 225 | 185 | 299 | 0.62 | |
| | 5 | [1] 6 | 245 | 321 | 390 | 0.82 | |
| | 6 | [1] 6 | 405 | 376 | 282 | 1.33 | |
| | 7 | [1] 6 | 302 | 487 | 380 | 1.28 | |
| | 8 | [1] 6 | 280 | 515 | 270 | 1.91 | |
| | Average | | 311 | 378 | 342 | 1.14 | 57 |
| 3-desoxyestradiol | 1 | [1] 6 | 320 | 140 | 235 | 0.60 | |
| | 2 | [1] 6 | 265 | 240 | 364 | 0.66 | |
| | 3 | [1] 6 | 270 | 419 | 447 | 0.94 | |
| | 4 | [1] 6 | 205 | 445 | 302 | 1.47 | |
| | 5 | [1] 6 | 420 | 342 | 317 | 1.08 | |
| | Average | | 296 | 317 | 333 | 0.95 | 88 |
| Estrone | 1 | [2] 6 | 255 | 401 | 262 | 1.53 | |
| | 2 | [2] 6 | 315 | 556 | 767 | 0.73 | |
| | 3 | [2] 6 | 275 | 679 | 1,088 | 0.62 | |
| | 4 | [2] 6 | 280 | 834 | 960 | 0.87 | |
| | 5 | [2] 6 | 255 | 615 | 818 | 0.75 | |
| | 6 | [2] 6 | 199 | 404 | 498 | 0.81 | |
| | 7 | [2] 6 | 190 | 538 | 559 | 0.96 | |
| | 8 | [2] 6 | 335 | 709 | 968 | 0.73 | |
| | Average | | 263 | 592 | 740 | 0.88 | 100 |
| Control | Average of 7 animals | | 252 | 504 | 355 | 1.48±0.277 | |

[1] Oral. [2] Injection.

As has been shown in the tests of Examples 16, 17, 18 and 19, these compounds as compared with estrone possess considerably powerful lipid shifting activity. Its value is presumed to have values as shown in Table VI, below, when the activity of estrone when injected is expressed as 100.

TABLE VI

| Compound | Lipid shifting activity | |
|---|---|---|
| | Injection | Oral |
| 3-desoxyestrone | 220–380 | About 60 |
| 3-desoxyestradiol | 290–350 | About 90 |

Next, the results of the estrogenic activity as shown in Example 15 and Table I and the lipid shifting activity as shown in Table VI with respect to the 3-desoxyestrone and 3-desoxyestradiol of the present invention were summarized and compared with the estrogenic activity and lipid shifting activity of the known compounds estrone, 16α-methyl-16-epi-estriol-3-methyl ether (XVI) and 16α-chloroestrone-methyl ether (XV), the results being shown in Table VII, below.

The L/E in the Table VII indicates the therapeutic effect.

TABLE VII

| Compound, estrone | Lipid shifting, (L)/100 | Estrogenic activity, (E)/100 | L/E/1 |
|---|---|---|---|
| The known compounds to be compared: | | | |
| 16α-methyl-16-epi-estriol-3-methyl ether | 37 | 1.6 | 23 |
| 16α-chloroestrone methyl ether | 140 | 0.8 | 175 |
| The compounds of this invention: | | | |
| 3-desoxyestrone | 220–380 | 0.5–1 | 220–760 |
| 3-desoxyestradiol | 290–350 | 5–10 | 29–70 |

As can be seen from the foregoing, as regards their therapeutic effect, that is, as to the ratio of the lipid shifting activity to the estrogenic activity, 3-desoxyestrone and 3-desoxyestradiol, the former in particular, surpass any of the heretofore-known steroids. Not only has the estrogenic activity been reduced considerably, but also the lipid shifting activity has been increased conspicuously. Thus, it can be said to be an ideal medical preparation. Moreover, the compounds of the present invention are structurally very similar to natural substances in that they do not contain any unnatural element or group such as chlorine atom or methyl group, which are known to frequently bring about harmful effects. Thus, since they do not produce any harmful side effects, they are highly suitable as therapeutics.

In addition, the fatty acid esters of 1,3,5(10)-estratrien-17β-ol (3-desoxyestradiol) also possess very excellent therapeutic effects similarly as in the case of the aforesaid 3-desoxyestrone and 3-desoxyestradiol.

In using the 3-desoxyestrone, 3-desoxyestradiol and the fatty acid esters of 3-desoxyestradiol for therapy, these compounds can be used as injections in the form of a solution obtained by dissolving the same to a concentration of 0.01–10% by weight in an oil innocuous to the human body such as, for example corn oil, safflower oil, sesame oil, soybean oil, rape oil, peanut oil, cotton seed oil, etc., or in the form of a suspension liquid in which the aforesaid compounds have been suspended, for example, in sterile distilled water. In preparing the suspension liquid, protective colloids such as gum arabic and carboxymethyl-cellulose, surface active agents such as, for example, Tween 80 (polysorbate) or buffers such as sodium phosphate can also be added.

The compounds of the present invention can also be made into tablets by mixing with a solid diluent innocuous to the human body such as, for example, lactose, starch, talc, magnesium stearate, etc. such that the content thereof of the foregoing compounds in each tablet becomes 0.1–20 mg., or they may be used as a buccal or troche preparation by mixing with such as gelatin, Carbowax 4000, lactose, stearic acid, or gum arabic, peppermint oil, flavoring, etc. such that the content thereof of the compounds of the invention becomes 0.1–100 mg. In addition, the compounds of this invention can also be used as an ointment by mixing the same with known ointment bases such that the concentration therein of the compounds becomes 0.1–5% by weight, or they can be used as a preventive of the aforementioned diseases in the form of a tonic by dissolving the same in an aqueous alcohol solution such that the concentration therein becomes 0.01–10%.

Next, examples of prescriptions of therapeutic compositions containing the compounds of the present invention will be set forth:

EXAMPLE 20

*An Example of a Prescription for Preparing an Oil Solution for Injection*

20 mg. of 3-desoxyestrone (or 3-desoxyestradiol) were dissolved in 500 ml. of acetone and then added to 20 l. of corn oil while stirring. After having obtained a homogeneous solution, it was placed in a vacuum distillation apparatus, and the acetone was distilled off under vacuum in a water bath of 40°–50° C. Finally, after heating for 1 hour at 100° C. under a pressure of 2–3 mm. Hg, the solution was filled in ampoules at the rate of 1 ml. each, and after sealing of the ampoules, sterilization was effected. The obtained oil solution is highly effective as an injection for treatment of such as arteriosclerosis, coronary sclerosis, hypercholesterolemia, climacterium disorders, dysmenorrhea, etc.

EXAMPLE 21

*An Example of a Prescription for Preparing a Suspension Liquid for Injection*

| | Pt. (wt.) |
|---|---|
| CMC (carboxy-methyl-cellulose) | 0.5 |
| Tween 80 (polysorbate) | 0.24 |
| Monosodium phosphate (NaH$_2$PO$_4$) | 1.38 |
| Disodium phosphate (Na$_2$HPO$_4$) | 0.36 |
| Benzyl alcohol | 1 |

The above were added to sterile saline solution and made into 100 parts.

3-desoxyestrone (or 3-desoxyestradiol) was made into a comminute powder (diameter about 10μ–30μ). 10 g. of this was mixed in 1 l. of the aforesaid sterile saline solution. This was followed by uniformizing the particles by means of a homogenizer. Then the solution was filled in ampoules at the rate of 1 ml. to each ampoule and thereafter sterilized.

The thus obtained suspension liquid can also be used as an injection similarly as in the case of the oil solution of Example 20, and it is also effective for treatment of disorders such as arteriosclerosis, coronary sclerosis, hypercholesterolemia, climacterium disorders, dysmenorrhea, etc.

EXAMPLE 22

*An Example of a Prescription for Preparing Tablets*

(A)

| | Pt. |
|---|---|
| 3-desoxyestrone | 1 |
| Lactose | 80 |
| Starch | 17.5 |
| Talc | 1 |
| Magnesium stearate | 0.5 |
| | 100 |

EXAMPLE 22—Continued (B)

| | Pt. |
|---|---|
| 3-desoxyestrone | 5 |
| Lactose | 76 |
| Starch | 17.5 |
| Talc | 1 |
| Magnesium stearate | 0.5 |
| | 100 |

(C)

| | |
|---|---|
| 3-desoxyestrone | 1 |
| Lactose | 289.5 |
| Tartaric acid | 4 |
| Starch in paste form | 5 |
| Stearic acid | 0.5 |
| | 300 |

In accordance with either of the above prescriptions A, B and C, the tablets are prepared such that tablet is 100–200 mmg. In preparing the tablets by the above prescriptions A and B, a part of the starch should be made into a paste before adding, while in case of prescription C all of the starch must be made into paste form, and it must be added as the last ingredient.

The tablet preparations thus obtained are administered orally. While they do not equal the injections obtained in Examples 20 and 21 in their therapeutic effect, they still are effective for treating disorders such as arteriosclerosis, coronary sclerosis, hyperchloesterolemia, climacterium disorders, dysmenorrhea, etc.

EXAMPLE 23

*An Example of a Prescription for Preparing a Buccal Preparation*

| | Mg. |
|---|---|
| Lactose | 305 |
| Carbowax 4000 | 40 |
| Stearic acid | 4 |
| Propylene glycol | 3.2 |
| Gelatin | 2 |
| Saccharin | 0.3 |
| Talc | 40 |
| 3-desoxyestrone | 5.0 |

In accordance with the above prescription all of the components except talc were mixed thoroughly. In performing the mixing, the gelatin and saccharin were dissolved thoroughly in water before adding. After completion of the mixing, the mixture was granulated and dried. Then talc was added to this, mixed evenly and the tablets were formed.

The buccal preparation obtained, when placed in the mouth, are absorbed through the mucous membrane and manifest therapeutic effect with respect to the disorders mentioned hereinbefore.

EXAMPLE 24

*An Example of a Prescription for Preparing a Troche*

| | | |
|---|---|---|
| 3-desoxyestrone | g | 0.200 |
| Gum arabic | g | 7.0 |
| Glucose | g | 100.0 |
| Peppermint water | drop | 1 |
| Distilled water | ml | 20 |

The powdered gum arabic, glucose, 3-desoxyestrone were thoroughly mixed together. To this mixture the distilled water (Japan Pharmacopoeia) to which peppermint water had been added was added, and the mixture was well moistened. This was then kneaded on a kneading board and thereafter made into 40 pieces with molds for producing troches.

The troche obtained had similar medicinal effect as in the case of the buccal preparation of the aforesaid Example 23.

EXAMPLE 25

*An Example of a Prescription for Preparing an Ointment*

| | G. |
|---|---|
| 3-desoxyestrone | 5.0 |
| Ethyl p-hydroxy-benzoate | 0.25 |
| Butyl p-hydroxy-benzoate | 0.25 |
| White vaseline | 250 |
| Stearyl alcohol | 250 |
| | 505.5 |

The above mixture was melted by heating, and while stirring at 75° C. the following mixture consisting of:

| | G. |
|---|---|
| Glycerine | 120 |
| Sodium lauryl sulfate | 10 |
| Sterile distilled water | 364.5 | which was heated in advance to 75° C. was added, and thereafter the mixture was cooled.

EXAMPLE 26

*An Example of a Prescription for Preparing an Ointment*

| | G. |
|---|---|
| 3-desoxyestrone | 10 |
| Carbowax 400 | 495 |
| Carbowax 4000 | 495 |

The above were mixed, melted by heating and thereafter cooled.

EXAMPLE 27

*An Example of a Prescription for Preparing a Tonic*

| | G. |
|---|---|
| 3-desoxyestrone | 1 |
| Glycerol | 40 |
| Methyl p-hydroxy-benzoate | 3 |
| Carbowax 1500 | 10 |
| Alcohol | 750 |
| Perfume | 0.5 |

The above were mixed and melted, and then was extended with distilled water until it became 1000 ml.

While we have described in detail in respect of the method of preparing the compounds of the present invention as well as therapeutic preparations containing the same, it will be understood the invention is not to be limited thereto except as set forth in the appended claims. Furthermore, in the appended claims, it is to be understood that the compound of the present invention expressed as 1,3,5(10)-estratrien-17-ol embraces both 1,3,5(10)-estratrien-17α-ol and 1,3,5(10)-estratrien-17β-ol.

Having thus set forth the nature of the invention, what we claim herein is:

1. A method of preparing 1,3,5(10)-estratrien-17-ol having the formula

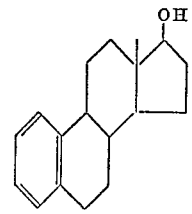

which is characterized in that a compound having the formula

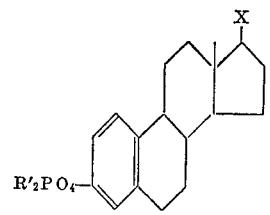

wherein X is a member selected from the group consisting of —OH, =O and —OR groups, R is an aliphatic acyl residue, and R', an alkyl group, is reduced by reacting therewith an alkali metal in liquid ammonia.

2. In the method of preparing 1,3,5(10)-estratrien-17-ol having the formula

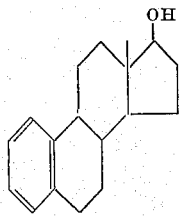

the step which comprises dissolving in a perhalogenated aliphatic hydrocarbon other than a perfluorinated aliphatic hydrocarbon a compound having the formula

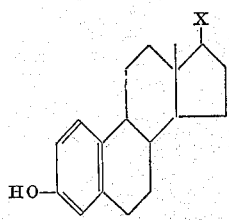

wherein X is a member selected from the group consisting of —OH, =O and —OR groups, and R, an aliphatic acyl residue, and reacting therewith dialkyl phosphite and a tertiary amine whereby is prepared a compound having the formula

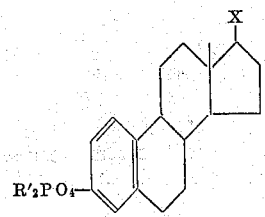

wherein X is as in the first mentioned formula, and R', an alkyl group.

3. A step according to claim 2 wherein the perhalogenated aliphatic hydrocarbon is a compound selected from the group consisting of carbon tetrachloride and hexachloroethane.

4. A method for preparing 1,3,5(10)-estratrien-17-ol having the formula

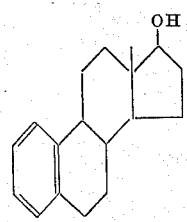

which comprises dissolving in a perhalogenated aliphatic hydrocarbon other than a perfluorinated aliphatic hydrocarbon a compound having the formula

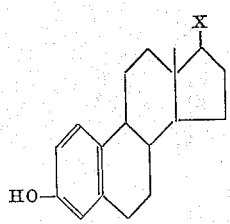

wherein X is a member selected from the group consisting of —OH, =O and —OR groups, and R, an aliphatic acyl residue, and reacting therewith dialkyl phosphite and a tertiary amine thereby obtaining a dialkyl phosphate having the formula

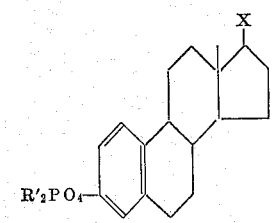

wherein R' is an alkyl group, and thereafter reducing the same by reacting therewith an alkali metal in liquid ammonia.

5. A method of preparing 1,3,5(10)-estratrien-17-ol having the formula

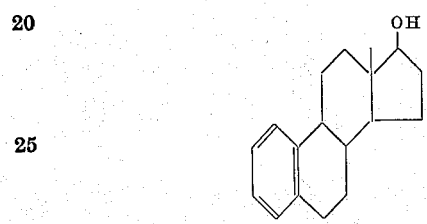

which comprises dissolving in a perhalogenated aliphatic hydrocarbon other than a perfluorinated aliphatic hydrocarbon a compound having the formula

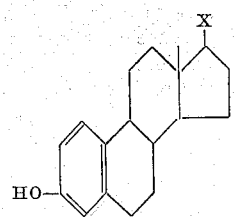

wherein X is a member selected from the group consisting of —OH, =O and —OR groups, and R, an aliphatic acyl residue, and reacting therewith dialkyl phosphite and a tertiary amine thereby obtaining a dialkyl phosphate having the formula

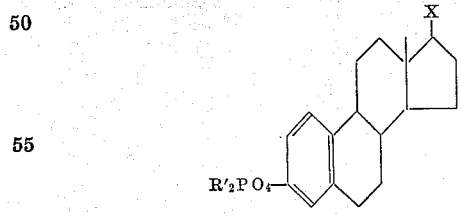

wherein R' is an alkyl group, and thereafter reducing the same by reacting therewith an alkali metal in liquid ammonia.

6. The method of preparing 1,3,5(10)-estratrien-17-one having the formula

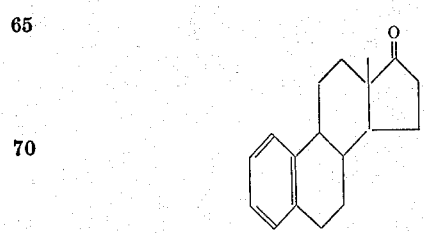

the step which comprises dissolving in a perhalogenated aliphatic hydrocarbon other than a perfluorinated aliphatic hydrocarbon a compound having the formula

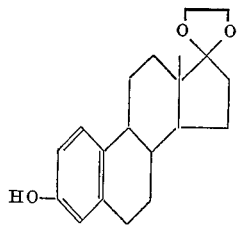

and reacting therewith dialkyl phosphite and a tertiary amine whereby is prepared a compound having the formula

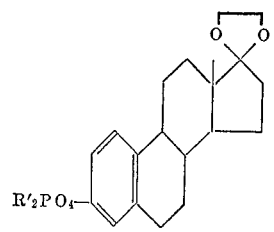

wherein R' is an alkyl group.

7. A step according to claim 6 wherein the perhalogenated aliphatic hydrocarbon is a compound selected from the group consisting of carbon tetrachloride and hexachloroethane.

8. A step according to claim 7 wherein the reaction is effected in the presence of a solvent which does not participate in the reaction.

9. A process for preparing 1,3,5(10)-estratrien-17-one having the formula

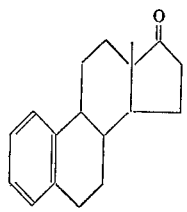

which comprises dissolving in a perhalogenated aliphatic hydrocarbon other than a perfluorinated aliphatic hydrocarbon a compound having the formula

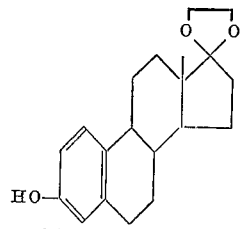

and reacting therewith dialkyl phosphite and a tertiary amine whereby is obtained a dialkyl phosphate having the formula

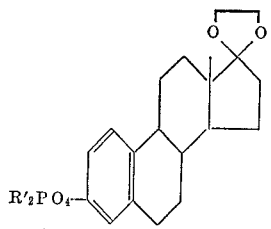

wherein R' is an alkyl group and thereafter said dialkyl phosphate is reduced by reacting same with an alkali metal in liquid ammonia thereby forming a compound having the formula

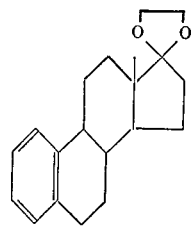

followed by treating it with a compound selected from the group consisting of inorganic and organic acids.

References Cited in the file of this patent

UNITED STATES PATENTS 2,928,847   Johns _____ Mar. 15, 1960

OTHER REFERENCES

Herzog et al.: J.A.C.S. 75, pages 269–272 (1953).
Loewenthal: Tetrahedron 6, page 281 (1959).
Fieser et al.: Steroids, 1959, pages 51 and 224, Reinhold Publishing Co., New York.